US011373260B2

(12) United States Patent
Mitsumaki et al.

(10) Patent No.: US 11,373,260 B2
(45) Date of Patent: Jun. 28, 2022

(54) INFORMATION PROCESSING DEVICE AND STORAGE MEDIUM FOR STORING CONTROL PROGRAM FOR CAR SHARING SERVICE

(71) Applicant: Toyota Jidosha Kabushiki Kaisha, Toyota (JP)

(72) Inventors: Koichiro Mitsumaki, Nagoya (JP); Masato Endo, Nagakute (JP); Ryota Kondo, Nagoya (JP); Yasuhisa Obata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 676 days.

(21) Appl. No.: 16/354,668

(22) Filed: Mar. 15, 2019

(65) Prior Publication Data

US 2019/0287202 A1  Sep. 19, 2019

(30) Foreign Application Priority Data

Mar. 19, 2018 (JP) .............................. JP2018-051108

(51) Int. Cl.
*G06Q 50/30* (2012.01)
*G06Q 10/02* (2012.01)
*G06Q 30/06* (2012.01)

(52) U.S. Cl.
CPC ............. *G06Q 50/30* (2013.01); *G06Q 10/02* (2013.01); *G06Q 30/0645* (2013.01); *G06Q 2240/00* (2013.01)

(58) Field of Classification Search
CPC ................................ G06Q 10/02; G06Q 50/30
See application file for complete search history.

(56) References Cited

U.S. PATENT DOCUMENTS 8,140,256 B1 * 3/2012 dos-Santos .......... G06Q 50/188
701/532
2011/0166898 A1 * 7/2011 Zarrow .................. G06Q 10/02
705/5

(Continued)

FOREIGN PATENT DOCUMENTS

CN        106600381 A      4/2017
CN        107424044 A     12/2017

(Continued)

OTHER PUBLICATIONS

Ghoseiri, Keivan et al., Real-Time Rideshare Matching Problem, Jan. 1, 2010, Rosa P, https://rosap.ntl.bts.gov/view/dot/25988 (Year: 2010).*

*Primary Examiner* — Emmett K. Walsh
*Assistant Examiner* — Michelle E Carey
(74) *Attorney, Agent, or Firm* — Dinsmore & Shohl LLP

(57) ABSTRACT

An information processing device include: a first accepting unit that accepts, from an owner, setting of conditions for renting his or her vehicle; a second accepting unit that accepts, from each of a plurality of users, setting of preferred conditions for using a vehicle; and a selecting unit that combines two or more of the preferred conditions for using a vehicle, which include at least a preferred condition that the user wants to use the one-way car sharing, compares the combined two or more preferred conditions for using a vehicle with the conditions for renting the vehicle, and if the combined two or more preferred conditions for using a vehicle match the conditions for renting the vehicle, selects each user having set the preferred conditions that match the conditions for renting the vehicle as users permitted to use the vehicle.

3 Claims, 6 Drawing Sheets

(56) References Cited

U.S. PATENT DOCUMENTS

| | | | |
|---|---|---|---|
| 2015/0199619 A1 | 7/2015 | Ichinose et al. | |
| 2015/0371153 A1* | 12/2015 | Lohmeier | G06Q 40/025 |
| | | | 705/5 |
| 2016/0356615 A1* | 12/2016 | Arata | G06Q 50/30 |
| 2019/0196503 A1* | 6/2019 | Abari | G06Q 10/00 |
| 2019/0295005 A1* | 9/2019 | Griffin | G06Q 10/02 |

FOREIGN PATENT DOCUMENTS

| | | |
|---|---|---|
| JP | 2002-099762 A | 4/2002 |
| JP | 2012-079127 A | 4/2012 |
| JP | 2016-148910 A | 8/2016 |
| JP | 2017-010189 A | 1/2017 |
| JP | 2018-041197 A | 3/2018 |
| WO | 2014/024254 A1 | 2/2014 |

* cited by examiner

FIG. 3

<OWNER VEHICLE DB>   104a

| OWNER ID | VEHICLE'S BASIC INFORMATION | | | | RENTING CONDITIONS | | | |
| --- | --- | --- | --- | --- | --- | --- | --- | --- |
| | VEHICLE ID | MODEL | SEATING CAPACITY | ... | FEATURES | | UNAVAILABLE TIME INFORMATION | RETURN LOCATION INFORMATION |
| | | | | | OWNER HIGHLIGHTS | | | |
| C1 (INDIVIDUAL) | M01 | XXX | 6 | ... | GOOD OLD ENGINE SOUND OF 30 YEARS AGO ... | | ONLY ON HOLIDAYS AND WEEKENDS | ... A-WARD, TOKYO |
| C2 (INDIVIDUAL) | M02 | XXX | 4 | ... | HAS GREAT ACCELERATION ... | | ONLY 8:00-18:00 ON MONS, WEDS, AND FRIS | ... B-CITY, SHIZUOKA |
| C3 (CORPORATE) | M03 TO M25 | YYY | 5 | ... | FREE GAS UP TO 50 KM | | ONLY 8:00-20:00 ON WEEKDAYS | ... C-CITY, KANAGAWA |
| C4 (CORPORATE) | M04 | YYY | 8 | ... | CUMULATIVE TOTAL OF OVER A MILLION USERS! | | ALL DAYS EXCEPT SATURDAYS | ... D-WARD, TOKYO |
| ... | ... | ... | ... | ... | ... | | ... | ... |

FIG. 4

<RESERVATION DB> 104b

| USER ID | USE TYPE | PREFERRED CONDITIONS ||||| OPTIONAL CONDITIONS | ... |
| | | PICKUP LOCATION | DROP-OFF LOCATION | PICKUP DATE/TIME | DROP-OFF DATE/TIME | | |
| --- | --- | --- | --- | --- | --- | --- | --- |
| U01 | ONE-WAY | ...A-WARD, TOKYO | ...B-WARD, YOKOHAMA, KANAGAWA | 8:00, MON, JAN 15 | 20:00, MON, JAN 15 | PREFER A NON-SMOKING VEHICLE WITH SEATING CAPACITY OF 6 OR MORE PASSENGERS... | ... |
| U02 | ROUND-TRIP | ...B-WARD, YOKOHAMA, KANAGAWA | — | 6:00, TUE, JAN 16 | 16:00, THU, JAN 18 | 5,000 YEN OR LESS PER DAY... | ... |
| U03 | ROUND-TRIP | ...H-CITY, SHIZUOKA | — | 6:00, SAT, MAR 3 | 20:00, WED, MAR 7 | MANUAL CAR, '90S SPORTS CAR,... | ... |
| U04 | ONE-WAY | ...B-WARD, YOKOHAMA, KANAGAWA | ...A-WARD, TOKYO | 20:00, THU, JAN 18 | 17:00, FRI, JAN 19 | EV OR PHV... | ... |
| U05 | ONE-WAY | ...E-CITY, FUKUI | ...K-CITY, ISHIKAWA | 20:00, THU, FEB 15 | 20:00, FRI, FEB 16 | COLD DISTRICT SPECIFICATION, EQUIPPED WITH WINTER TIRES,... | ... |
| U08 | ROUND-TRIP | ...M-CITY, CHIBA | — | 6:00, TUE, MAR 27 | 14:00, THU, MAR 29 | FOR DATING, AT LEAST 4 STAR REVIEW,... | ... |
| ... | ... | ... | ... | ... | ... | ... | ... |

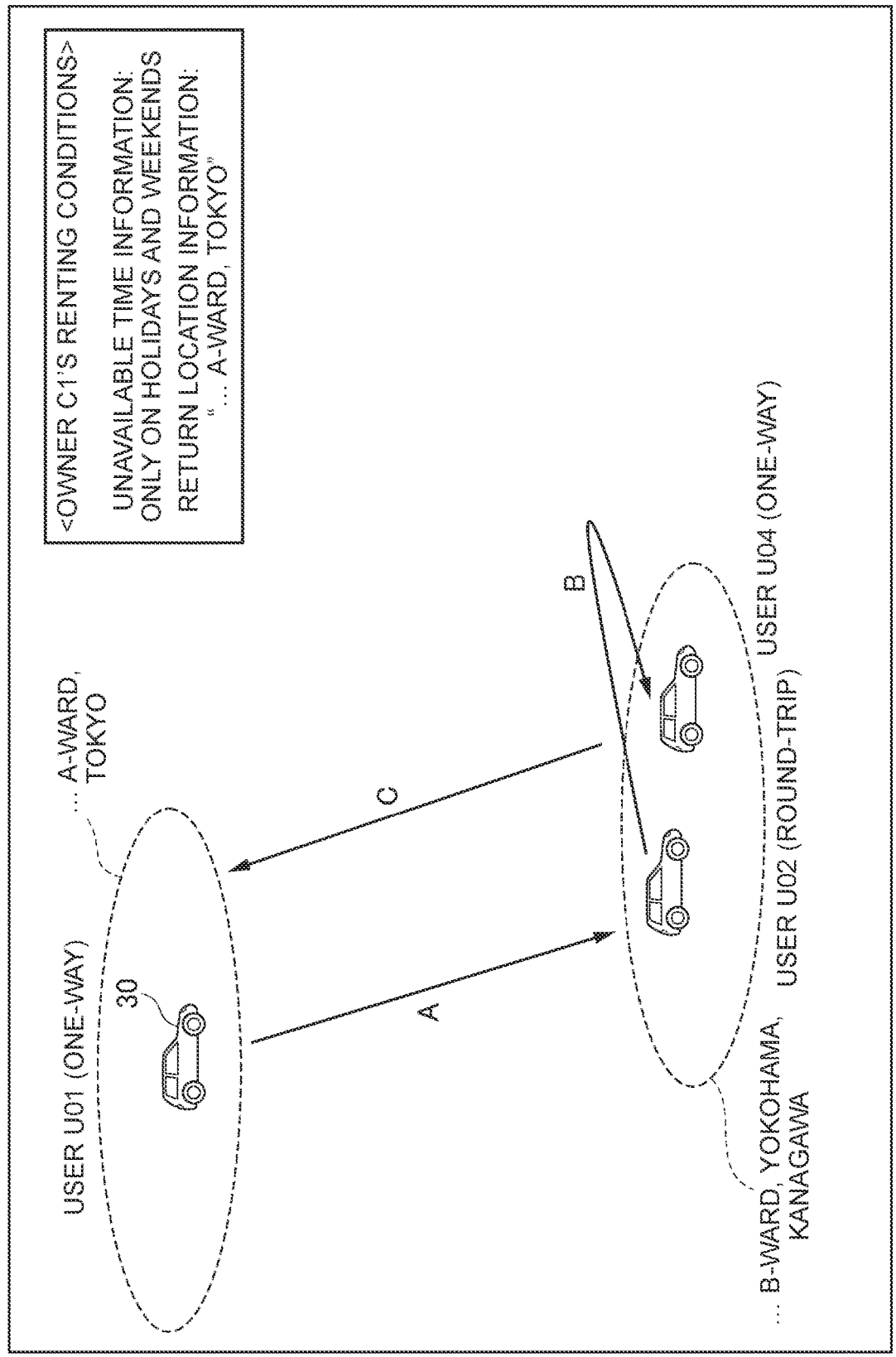

INFORMATION PROCESSING DEVICE AND STORAGE MEDIUM FOR STORING CONTROL PROGRAM FOR CAR SHARING SERVICE

CROSS-REFERENCE TO RELATED APPLICATIONS

This application claims priority to Japanese Patent Application No. 2018-051108 filed on Mar. 19, 2018, which is incorporated herein by reference in its entirety including the specification, drawings and abstract.

BACKGROUND

1. Technical Field

The present disclosure relates to information processing devices and storage media for storing a control program for a car sharing service.

2. Description of Related Art

Car rental services called car sharing which allow a plurality of users to share a single vehicle are becoming increasingly popular. In typical car sharing services, the users are required to return vehicles to the same location as they picked them up. This type of car sharing service is called round-trip car sharing.

Another type of car sharing service called one-way car sharing has also been considered (see, e.g., Japanese Patent Application. Publication No. 2017-010189). The one-way car sharing service allows the users to return vehicles to locations other than where they picked them up.

SUMMARY

With further development of the car sharing services, the car sharing services will possibly be provided in various forms in the future. For example, vehicles can be effectively used if those owners who do not use their vehicles on weekdays, namely who use their vehicles only during weekends, provide their vehicles for the car sharing service (hereinafter sometimes referred to as "CS service") on weekdays and have them returned to the locations designated by themselves (e.g., owners' homes where the users picked up the vehicles, parking lots near owners' homes, etc.) by weekend.

In conventional CS services, however, only round-trip car sharing is permitted and one-way car sharing is not permitted if there is a condition that the vehicles must be returned to the locations designated by the owners. The vehicles therefore stay at the designated locations unless round-trip car sharing is requested, and the vehicles cannot be effectively used.

The disclosure provides a technique that makes it possible to more effectively use vehicles in car sharing services that allow an owner to designate unavailable times that are times when the owner uses his or her vehicle and a return location of the vehicle when the vehicle is rented during a time other than the unavailable times, as compared to conventional examples.

An information processing device according to a first aspect of the disclosure includes: a first accepting unit that accepts, from an owner, setting of conditions for renting his or her vehicle, the setting of the conditions for renting the vehicle including designation of unavailable times that are times when the owner uses the vehicle and designation of a return location of the vehicle when the vehicle is rented during a time other than the unavailable times; a second accepting unit that accepts, from each of a plurality of users, setting of preferred conditions for using a vehicle, the setting of the preferred conditions for using a vehicle including, designation of either round-trip car sharing or one-way car sharing, designation of a pickup location, and designation of a drop-off location; and a selecting unit that combines two or more of the preferred conditions for using a vehicle, which include at least a preferred condition that the user wants to use the one-way car sharing, compares the combined two or more preferred conditions for using a vehicle with the conditions for renting the vehicle, and if the combined two or more preferred conditions for using a vehicle match the conditions for renting the vehicle, selects each user having set the preferred conditions that match the conditions for renting the vehicle as users permitted to use the vehicle.

In the information processing device according to the above aspect, the conditions for renting the vehicle may include autonomous driving information on whether the vehicle has an autonomous driving function or not. In the case where the conditions for renting the vehicle which have been accepted by the first accepting unit include the autonomous driving information that the vehicle has the autonomous driving function, the selecting unit may preferentially select a user who wants to use the one-way car sharing as the user permitted to rent the vehicle.

In the information processing device according to the above aspect, for each renting of the vehicle, the selecting unit may select the users permitted to use the vehicle so that the number of users who want to use the one-way car sharing is equal to or larger than the number of users who want to use the round-trip car sharing.

In a storage medium according to a second aspect of the disclosure, the storage medium stores a control program for a car sharing service, and the control program causes a computer to perform the steps of: accepting, from an owner, setting of conditions for renting his or her vehicle, the setting of the conditions for renting the vehicle including designation of unavailable times that are times when the owner uses the vehicle and designation of a return location of the vehicle when the vehicle is rented during a time other than the unavailable times; accepting, from each of a plurality of users, setting of preferred conditions for using a vehicle, the setting of the preferred conditions for using a vehicle including designation of either round-trip car sharing or one-way car sharing, designation of a pickup location, and designation of a drop-off location; and combining two or more of the preferred conditions for using a vehicle, which include at least a preferred condition that the user wants to use the one-way car sharing, comparing the combined two or more preferred conditions for using a vehicle with the conditions for renting the vehicle, and if the combined two or more preferred conditions for using a vehicle match the conditions for renting the vehicle, selecting each user having, set the preferred conditions that match the conditions for renting the vehicle as users permitted to use the vehicle.

According to each of the above aspects, a technique can be provided which makes it possible to more effectively use vehicles in car sharing services that allow an owner to designate unavailable times that are times when the owner uses his or her vehicle and a return location of the vehicle when the vehicle is rented during a time other than the unavailable times, as compared to conventional examples.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a diagram showing an example of an owner vehicle database (DB);

FIG. 4 is a diagram showing a specific example of a reservation database (DB);

FIG. 5 is a schematic diagram illustrating a matching process that is performed by a selecting unit.

DETAILED DESCRIPTION OF EMBODIMENTS

Figure 1:
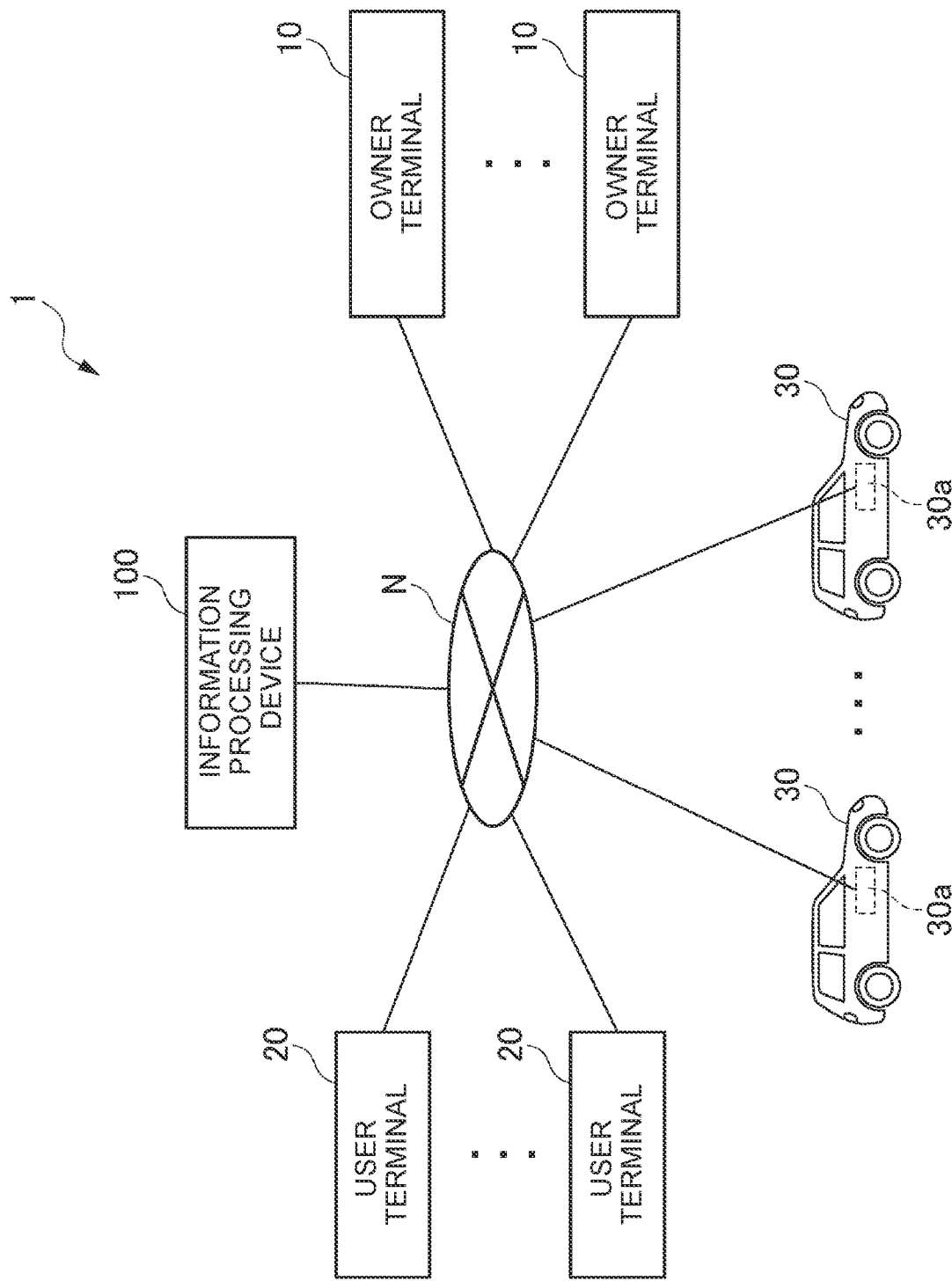
FIG. 1 is a diagram showing an example of the configuration of a car sharing system according to an embodiment.

An embodiment will be described with reference to the accompanying drawings. Elements denoted by the same reference characters have the same or similar configuration.

A. Embodiment

System Configuration

FIG. 1 is a diagram showing an example of the configuration of a car sharing system 1 according to an embodiment. The car sharing system 1 includes owner terminals 10, user terminals 20, vehicles 30, and an information processing device 100. Each vehicle 30 is equipped with an in-vehicle system 30*a*. The owner terminals 10, the user terminals 20, the in-vehicle systems 30*a*, and the information processing device 100 can communicate with each other via a communication network N.

Outline of CS Service

How the car sharing service (CS service) basically works will be described. Owners (including individuals and corporations) who want to rent their vehicles first register as an owner by entering their basic information (name, gender, age, address, phone number, social networking service (SNS) account information, bank account, etc.) via the owner terminals 10. The owners then set conditions for renting their vehicles (described later) via the owner terminals 10 and wait for requests for renting their vehicles from users. Users who want to rent a vehicle first register as a user by entering their basic information 10. (name, gender, age, address, phone number, SNS account information, credit card number, etc.) via the user terminals 20. The users then set preferred conditions for using a vehicle (described later) via the user terminals 20.

The information processing device 100 performs a matching process by comparing (checking) the conditions for renting the vehicle which have been set by each owner with (against) the preferred conditions for using a vehicle which have been set by the users. In conventional CS services, only round-trip car sharing is permitted and one-way car sharing is not permitted if the conditions for renting the vehicle include a condition that the vehicle must be returned to the location designated by the owner.

However, the CS service according to the present embodiment is characterized in that, even if the conditions for renting the vehicle include the condition that the vehicle must be returned to the designated location, not only round-trip car sharing but also one-way car sharing are permitted as long as the vehicle can be returned by the time designated by the owner.

The owner terminal 10 is a terminal that is used by the owner who rents his or her vehicle. For example, the owner terminal 10 is a smartphone, a tablet terminal, a wearable terminal, a mobile terminal, a notebook computer, etc. The owner terminal 10 displays a screen for registering for the CS service as an owner and a screen for setting conditions for renting owner's vehicle. The owner can perform a procedure for registering as an owner, a procedure for renting his or her vehicle, etc. by entering various kinds of information as prompted by these screens.

The user terminal 20 is a terminal that is used by the user who rents a vehicle. For example, the user terminal 20 is a smartphone, a tablet terminal, a wearable terminal, a mobile terminal, a notebook computer, etc. The user terminal 20 displays a screen for registering for the CS service as a user and a screen for setting, preferred conditions for using a vehicle. The user can perform a procedure for registering as a user, a procedure for renting a desired vehicle, etc. by entering various kinds of information as prompted by these screens.

The vehicles 30 are vehicles provided for the CS service and are provided by the owners. The vehicles 30 include both vehicles owned by individuals and vehicles owned by corporations. The vehicles 30 can be any kind of wheeled vehicles. Specifically, the vehicles 30 may be vehicles provided for car sharing by corporations, shared taxis, or vehicles owned by individuals. The vehicles 30 are not limited to cars. For example, the vehicles 30 may be large vehicles that can hold over a dozen to several tens of passengers like buses or may be motorcycles, motorized tricycles, etc. The vehicles 30 may be vehicles that the users drive with a steering device (hereinafter sometimes referred to as "manual vehicles") or may be vehicles that can be driven autonomously (hereinafter sometimes referred to as "autonomous vehicles").

In the case where the vehicle 30 is a manual vehicle, a return location designated by the owner of the vehicle 30 may be registered in advance in the in-vehicle system 30*a* such as a car navigation system. In the case where the vehicle 30 is an autonomous vehicle, information on a designated location, control information for autonomously driving the vehicle 30 to the designated location, etc. are transmitted from the information processing device 100 to the in-vehicle system 30*a*.

The information processing device 100 accepts owner registration and user registration. The information processing device 100 accepts setting of the conditions for renting the vehicle 30 from the owners and registers the accepted conditions in a database. The information processing device 100 also accepts setting of the preferred conditions for using a vehicle 30 from the users and registers the accepted preferred conditions in a database. The information processing device 100 compares (checks) the conditions for renting the vehicle 30 which have been set by each owner with (against) the preferred conditions for using a vehicle 30 which have been set by the users to select users to whom the vehicle 30 is to be rented (i.e., a matching process). As described later in detail, in the present embodiment, the information processing device 100 selects a plurality of users including at least a user who wants to use one-way car sharing in order to implement an efficient CS service. The information processing device 100 may be formed by one or more information processing devices or may be formed by using a cloud server or a virtual server.

Functional Block Configuration

Figure 2:
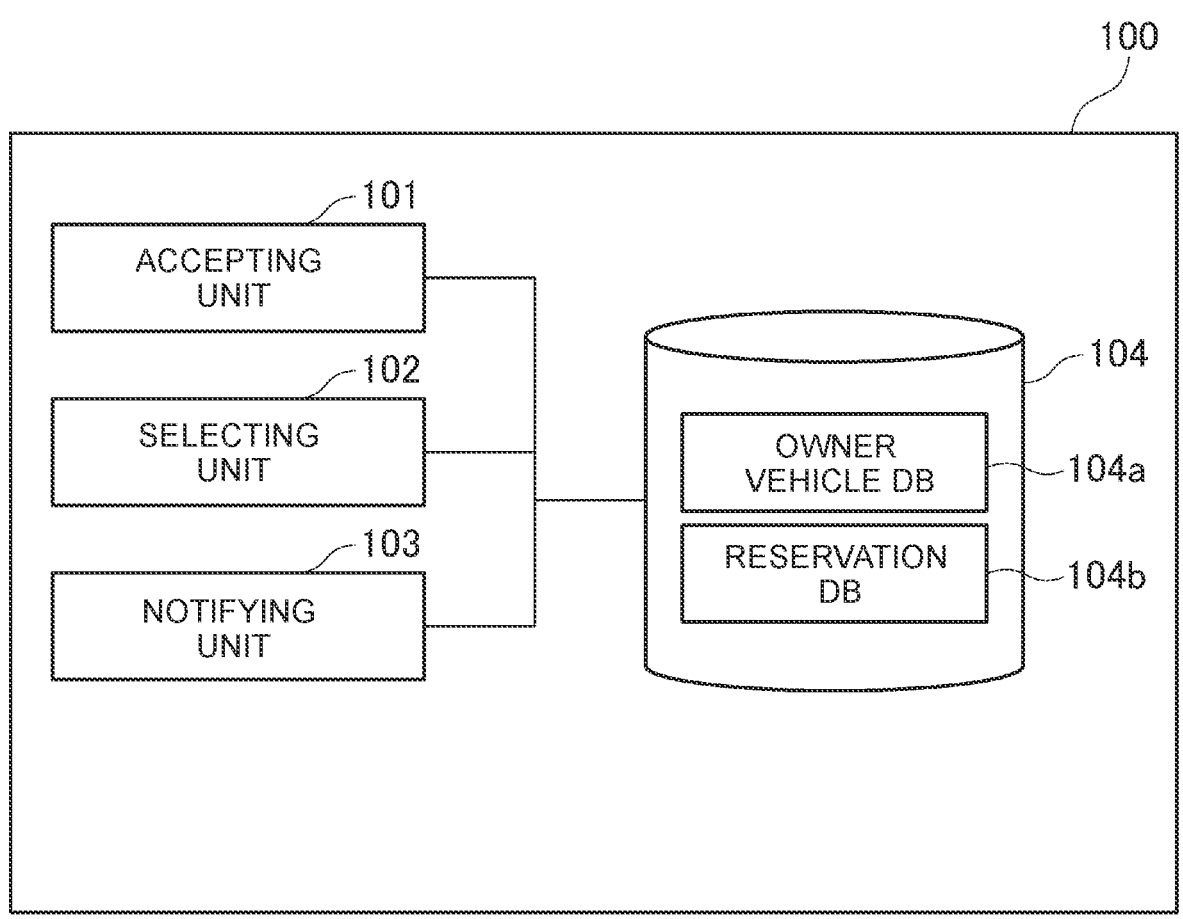
FIG. 2 is a diagram showing an example of the configuration of functional blocks of an information processing device.

FIG. 2 is a diagram showing an example of the configuration of functional blocks of the information processing device 100. The information processing device 100 includes an accepting unit 101, a selecting unit 102, a notifying unit 103, and a storage unit 104.

The accepting unit 101, the selecting unit 102, and the notifying unit 103 can be implemented by executing a program stored in a memory by a CPU of the information processing device 100. This program can be stored in a storage medium. The storage medium storing this program therein may be a non-transitory storage medium. The non-transitory storage medium is not particularly limited, but for example, may be a storage medium such as a USB memory or a CD-ROM. The storage unit 104 can be implemented by using a memory or a storage device which is included in the information processing device 100.

The storage unit 104 stores an owner vehicle database (DB) 104*a* and a reservation database (DB) 104*b* therein. The conditions for renting the available vehicles 30 etc. which have been registered by the owners are stored in the owner vehicle DB 104*a*. The preferred conditions for using a vehicle 30 etc. which have been registered by the users are stored in the reservation DB 104*b*.

The accepting unit (first accepting unit) 101 accepts setting of the conditions for renting the vehicle 30 from each owner and registers the accepted conditions for renting the vehicle 30 in the owner vehicle DB 104*a*. The accepting unit (second accepting unit) 101 accepts setting of the preferred conditions for using a vehicle 30 from the users and registers the accepted preferred conditions in the reservation DB 104*b*. FIG. 3 is a diagram showing a specific example of the owner vehicle DB 104*a*, and FIG. 4 is a diagram showing an example of the reservation DB 104*b*.

Owner Vehicle DB 104*a*

As shown in FIG. 3, owner IDs (e.g., owners' names) for uniquely identifying the owners and the conditions for renting their vehicles 30 have been registered in the owner vehicle DB 104*a* such that each owner ID corresponds to the conditions for renting his or her vehicle 30. The conditions for renting the vehicle 30 include vehicle 30's basic information, features, unavailable time information, and return location information. The vehicle 30's basic information includes information on vehicle ID (e.g., vehicle's license plate number) for uniquely identifying the vehicle 30, vehicle model, make, seating capacity, etc. The features are information on highlights of the vehicle 30 by the owner (e.g., "has great acceleration . . . "). The unavailable time information is information on when the owner uses the vehicle 30 (in other words, when the vehicle 30 is not available to the users). The return location information is information on the return location of the vehicle 30 which is designated by the owner.

In the example of FIG. 3, the owner whose owner ID is "C1 (individual)" has set the vehicle model "XXX" with vehicle ID of "M01" and seating capacity of "6 passengers" as vehicle's basic information and has set "good old engine sound of 30 years ago . . . " as features. The owner has also set information that he or she uses the vehicle 30 "only on holidays and weekends" as unavailable time information and has set " . . . A-Ward, Tokyo" as return location information. Although the owner may set his or her home, a station nearest to his or her home, a parking lot near his or her home, etc. as return location information, the owner may set other locations (e.g., major tourist spots etc.) as return location information.

Reservation DB 104*b*

As shown in FIG. 4, user IDs (e.g., users' names) for uniquely identifying the users and preferred conditions for using a vehicle 30 have been registered in the reservation DB 104*b* such that each user ID corresponds to his or her preferred conditions for using a vehicle 30. The preferred conditions for using a vehicle 30 include the type of car sharing designated by the user, a pickup location, a drop-off location, pickup date and time, drop-off date and time, optional conditions, etc. Specifically, the user sets either round-trip or one-way as the type of car sharing, sets information on a location (address, latitude and longitude, etc.) where the user wants to pick up a vehicle 30 as a pickup location, and sets information on a location (address, latitude and longitude, etc.) where the user wants to drop off the vehicle 30 as a drop-off location. The user also sets a date and time when the user wants to depart from the pickup location as a pickup date and time and sets a date and time when the user wants to arrive at the drop-off location as a drop-off date and time. The user also sets optional conditions that are preferably met when using the CS service.

In the example of FIG. 4, the user whose user ID is "U01" has set conditions that he or she wants to use "one-way" car sharing, wants to pick up a vehicle at " . . . A-Ward, Tokyo" at "8:00 on Mon, January 15" and drop it off at " . . . B-Ward, Yokohama, Kanagawa" at "20:00 on Mon, January 15" (in this case, what is called one-way trip), and "prefers a non-smoking vehicle with seating capacity of 6 passengers or more . . . " as preferred conditions for using the vehicle 30. The user whose user ID is "U02" has set conditions that he or she wants to use "round-trip" car sharing, wants to pick up a vehicle at " . . . B-Ward, Yokohama, Kanagawa" at "6:00 on Tue, January 16" and drop it off at the same location as the pickup location, namely " . . . B-Ward, Yokohama, Kanagawa," at "16:00 on Thu, January 18," and prefers "5,000 yen or less per day . . . " as preferred conditions for using the vehicle 30.

Regarding the "pickup date/time," all or part of the date and time may be omitted when the user does not want to specify a specific date and time. For example, if the user wants to pick up a vehicle at " . . . Nagoya, Aichi" on "March 20" but does not have to pick it up at a specific time (can depart at any time), the user can set such information.

The selecting unit 102 compares (checks) the conditions for renting the vehicle 30 which have been set by each owner with (against) the preferred conditions for using a vehicle 30 which have been set by the users to select a plurality of users including at least a user who wants to use one-way car sharing (i.e., a matching process).

FIG. 5 is a schematic diagram illustrating the matching process that is performed by the selecting unit 102. In the example shown in FIG. 5, the owner whose owner ID is "C1 (individual)" has set "only on holidays and weekends" as unavailable times, namely times when the owner uses his or her vehicle, and has set " . . . , A-Ward, Tokyo" as a return location. The selecting unit 102 searches the reservation DB 104b to see whether there is any combination of the preferred conditions which satisfies these conditions set by this owner.

In the example shown in FIG. 5, the selecting unit 102 determines that the combination of the preferred conditions of the user whose user ID is "U01," the user whose user ID is "U02," and the user whose user ID is "U04" satisfies the conditions for renting the vehicle 30 which have been set by this owner. Specifically, the user whose user ID is "U01" first picks up the vehicle 30 at " . . . A-Ward, Tokyo" at "8:00 on Mon, January 15" and drops it off at " . . . B-Ward, Yokohama, Kanagawa" at "20:00 on Mon, January 15" by using "one-way" car sharing (see A in FIG. 5). Next, the user whose user. ID is "U02" picks up the vehicle 30 at " . . . B-Ward, Yokohama, Kanagawa" at "6:00 on Tue, January 16" and drops it off at the same location as the pickup location, namely at " . . . B-Ward, Yokohama, Kanagawa," at "16:00 on Thu, January 18" by using "round-trip" car sharing (see B in FIG. 5). The user whose user ID is "U04" then picks up the vehicle 30 at " . . . B-Ward, Yokohama, Kanagawa" at "20:00 on Thu, January 18" and drops it off at " . . . A-Ward, Tokyo" at "17:00 on Fri, January 19" by using "one-way" car sharing (see C in FIG. 5). The owner's vehicle 30 is thus returned to " . . . A-Ward, Tokyo" by Sat, January 20, namely by "weekend."

As described above, a plurality of users including at least a user who wants to use one-way car sharing are permitted to sequentially use the vehicle 30 like a relay race. The vehicles 30 can thus be more effectively used as compared to conventional CS services in which only round-trip car sharing is permitted and one-way car sharing is not permitted if there is a condition that the vehicle must be returned to the location designated by the owner.

Once the combination of the preferred conditions is determined by the selecting unit 102, the notifying unit 103 provides the owner who rents his or her vehicle with details on renting the vehicle and provides each user permitted to rent the vehicle with details on using the vehicle.

Processing Procedure

Figure 6:
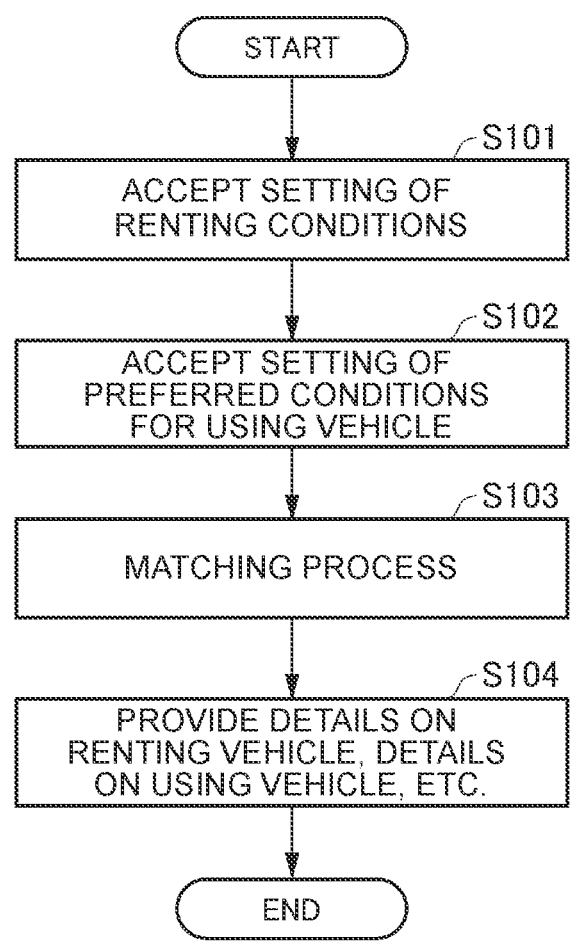
FIG. 6 is a diagram illustrating an example of a processing procedure that is performed by the information processing device.

Next, the processing procedure that is performed by the information processing device 100 will be described. FIG. 6 is a diagram illustrating an example of the processing procedure that is performed by the information processing device 100.

In step S101, the accepting unit 101 accepts setting of the conditions for renting the vehicle 30 from each owner and registers the accepted conditions in the owner vehicle DB 104a. The accepting unit 101 may display a screen for accepting setting of the conditions for renting the vehicle 30 on the owner terminal 10 of each owner who wants to rent his or her vehicle 30. Each owner enters the conditions for renting the vehicle 30 such as vehicle 30's basic information, features, unavailable time information, and return location information as prompted by the screen.

In step S102, the accepting unit 101 accepts setting of the preferred conditions for using a vehicle from each user who wants to use the CS service and stores the accepted preferred conditions in the reservation DB 104b. The accepting unit 101 may display a screen for accepting a reservation on the user terminal 20 of each user who wants to make a reservation. Each user enters the preferred conditions for using a vehicle such as the type of car sharing (i.e., either round-trip or one-way), a pickup location, a drop-off location, pickup date and time, drop-off date and time, and optional conditions as prompted by the screen.

In step S103, the selecting unit 102 compares (checks) the conditions for renting the vehicle 30 which have been set by each owner with (against) the preferred conditions for using a vehicle 30 which have been set by the users to select a plurality of users including at least a user who wants to use one-way car sharing (i.e., a matching process). Since a specific method for selecting a plurality of users is described in detail above with reference to FIG. 5, description thereof will not be repeated.

Once a combination of the preferred conditions for using a vehicle 30 is determined by the selecting unit 102, the notifying unit 103 provides the owner who rents his or her vehicle 30 with details on renting the vehicle 30 and provides each user permitted to rent the vehicle 30 with details on using the vehicle 30 in step S104. The details on renting the vehicle 30 include scheduled pickup dates and times, scheduled return dates and times, each user's identification information (IDs etc.), pickup locations, drop-off locations, and optional conditions, etc. The details on using the vehicle 30 include identification information (ID etc.) of the owner of the vehicle permitted to be rented, vehicle's basic information (model, make, seating capacity, etc.), features, etc.

In the case where the vehicle 30 to be rented is an autonomous vehicle, the notifying unit 103 sends information on a travel route to the return location designated by the owner to the in-vehicle system 30a of the vehicle 30. The in-vehicle system 30a of the vehicle 30 implements autonomous driving to the designated return location by controlling the vehicle 30 along to the received travel route from the drop-off location of the last user in the relay (in the example of FIG. 5, the user whose user ID is "U04").

As described above, according to the present embodiment, a plurality of users are permitted to sequentially use the vehicle 30 like a relay race, whereby not only round-trip car sharing but also one-way car sharing can be permitted. The vehicles can thus be more effectively used as compared to conventional CS services in which only round-trip car sharing is permitted and one-way car sharing is not permitted if there is a condition that the vehicle must be returned to the location designated by the owner.

B. Modifications

For each renting of the vehicle 30, the selecting unit 102 may select users so that the number of users who have made a reservation for one-way car sharing is equal to or larger than the number of users who have made a reservation for round-trip car sharing. For example, it is assumed that the following two combinations (first candidate, second candidate) of the preferred conditions of the users satisfy the conditions for renting a certain vehicle 30.

First candidate: user A (one-way)→user B (one-way) →user C (round-trip)→user D (one-way)

Second candidate: user a (one-way)→user b (round-trip) →user c (round-trip)

In this case, for the first candidate, the number of one-way users (three) is larger than the number of round-trip users (one). For the second candidate, however, the number of one-way users (one) is smaller than the number of round-trip users (two). The selecting unit 102 therefore selects the users of the first candidate as users permitted to use the vehicle 30.

The selecting unit 102 may preferentially select one-way users over round-trip users. For example, it is assumed that the following two combinations (first candidate, second candidate) of the preferred conditions of the users satisfy the conditions for renting a certain vehicle 30.

First candidate: user A (round-trip)→user B (one-way)
Second candidate: user a (one-way)→user b (one-way)→user c (one-way)

In this case, the first candidate includes one round-trip user, while the second candidate does not include any round-trip user. The selecting unit 102 therefore selects the users of the second candidate as users permitted to use the vehicle 30.

Although not particularly mentioned in the above embodiment, the selecting unit 102 may select users based also on the features included in the conditions for renting the vehicle, the optional conditions included in the preferred conditions for using a vehicle, etc. For example, it is assumed that there are two users whose preferred conditions for using a vehicle are exactly the same except for the optional conditions, and the optional conditions of one user are satisfied, but the optional conditions of the other user are not satisfied. In this case, the selecting unit 102 preferentially selects the user whose optional conditions are satisfied.

Although not particularly mentioned in the above embodiment, the vehicle's basic information included in the conditions for renting the vehicle may include autonomous driving information on whether the vehicle has an autonomous driving function or not. For example, in the case where the vehicle's basic information includes the autonomous driving information that the vehicle has the autonomous driving function, the selecting unit 102 may preferentially select one-way users as users permitted to use the vehicle.

C. Miscellaneous Items

In the specification, the term "unit" does not merely mean a physical configuration. The term "unit" includes the case where a process that is performed by the "unit" is implemented by software. A process that is performed by a single "unit" or device may be implemented by two or more physical configurations or devices, or a process that is performed by two or more "units" or devices may be implemented by single physical configuration or device.

The order of the steps in each process described above in the specification may be changed as desired within a range that does not cause inconsistency in processing or these steps may be performed in parallel.

What is claimed is:

1. An information processing device, comprising:
a CPU configured to:
accept, from an owner, setting of conditions for renting his or her vehicle, the setting of the conditions for renting the vehicle including designation of unavailable times that are times when the owner uses the vehicle and designation of a return location of the vehicle when the vehicle is rented during a time other than the unavailable times;
accept, from each of a plurality of users, setting of preferred conditions for using a vehicle, the setting of the preferred conditions for using a vehicle including designation of either round-trip car sharing or one-way car sharing, designation of a pickup location, and designation of a drop-off location;
combine two or more of the preferred conditions for using a vehicle, which include at least a preferred condition that the user wants to use the one-way car sharing, compare the combined two or more preferred conditions for using a vehicle with the conditions for renting the vehicle, and if the combined two or more preferred conditions for using a vehicle match the conditions for renting the vehicle, select each user having set the preferred conditions that match the conditions for renting the vehicle as users permitted to use the vehicle;
for each renting of the vehicle, select the users permitted to use the vehicle so that the number of users who want to use the one-way car sharing is equal to or larger than the number of users who want to use the round-trip car sharing; and
in a case where the vehicle rented is an autonomous vehicle, determine a travel route to the return location designated by the owner such that an in-vehicle system of the vehicle implements autonomous driving to the designated return location by controlling the vehicle along the travel route from a drop-off location of a last user in a sequence of users.

2. The information processing device according to claim 1, wherein
the conditions for renting the vehicle include autonomous driving information on whether the vehicle has an autonomous driving function or not, and
in the case where the conditions for renting the vehicle which have been accepted by the CPU include the autonomous driving information that the vehicle has the autonomous driving function, the CPU is configured to preferentially select a user who wants to use the one-way car sharing as the user permitted to rent the vehicle.

3. A non-transitory storage medium that stores a control program for a car sharing service, wherein the control program causes a computer to perform the steps of
accepting, from an owner, setting of conditions for renting his or her vehicle, the setting of the conditions for renting the vehicle including designation of unavailable times that are times when the owner uses the vehicle and designation of a return location of the vehicle when the vehicle is rented during a time other than the unavailable times,
accepting, from each of a plurality of users, setting of preferred conditions for using a vehicle, the setting of the preferred conditions for using a vehicle including designation of either round-trip car sharing or one-way car sharing, designation of a pickup location, and designation of a drop-off location,
combining two or more of the preferred conditions for using a vehicle, which include at least a preferred condition that the user wants to use the one-way car sharing, comparing the combined two or more preferred conditions for using a vehicle with the conditions for renting the vehicle, and if the combined two or more preferred conditions for using a vehicle match the conditions for renting the vehicle, selecting each user having set the preferred conditions that match the conditions for renting the vehicle as users permitted to use the vehicle,
for each renting of the vehicle, selecting the users permitted to use the vehicle so that the number of users who want to use the one-way car sharing is equal to or larger than the number of users who want to use the round-trip car sharing, and
in a case where the vehicle rented is an autonomous vehicle, determining a travel route to the return location designated by the owner such that an in-vehicle system of the vehicle implements autonomous driving to the designated return location by controlling the vehicle along the travel route from a drop-off location of a last user in a sequence of users.

\* \* \* \* \*